(12) United States Patent
Ishii et al.

(10) Patent No.: US 12,498,930 B2
(45) Date of Patent: Dec. 16, 2025

(54) STORE TO LOAD FORWARDING USING HASHES

(71) Applicant: Arm Limited, Cambridge (GB)

(72) Inventors: Yasuo Ishii, Austin, TX (US);
Abhishek Raja, Niagara Falls, NY (US); Zachary Allen Kingsbury, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/965,275

(22) Filed: Oct. 13, 2022

(65) Prior Publication Data

US 2024/0126554 A1    Apr. 18, 2024

(51) Int. Cl.
*G06F 9/38* (2018.01)

(52) U.S. Cl.
CPC ............ *G06F 9/3834* (2013.01); *G06F 9/384* (2013.01); *G06F 9/3842* (2013.01)

(58) Field of Classification Search
CPC ............... G06F 9/30032; G06F 9/3004; G06F 9/30043; G06F 9/3824; G06F 9/3826; G06F 9/3834; G06F 9/3838; G06F 9/384; G06F 9/3842; G06F 9/325
See application file for complete search history.

(56) References Cited

U.S. PATENT DOCUMENTS

| | | | |
|---|---|---|---|
| 6,622,237 B1 | 9/2003 | Keller | |
| 6,694,424 B1 * | 2/2004 | Keller | G06F 9/3856 |
| | | | 712/216 |
| 7,181,598 B2 | 2/2007 | Jourdan | |
| 10,838,729 B1 * | 11/2020 | Al-Otoom | G06F 9/3838 |
| 12,079,126 B2 * | 9/2024 | Favor | G06F 12/0855 |
| 12,086,591 B2 * | 9/2024 | Shukla | G06F 9/3856 |
| 2003/0065909 A1 | 4/2003 | Jourdan | |
| 2004/0044881 A1 | 3/2004 | Maier | |
| 2005/0010744 A1 | 1/2005 | Filippo | |
| 2007/0038846 A1 * | 2/2007 | Kadambi | G06F 9/3838 |
| | | | 712/225 |
| 2009/0037697 A1 | 2/2009 | Ramani | |
| 2010/0049952 A1 * | 2/2010 | Eddy | G06F 9/3834 |
| | | | 712/223 |
| 2011/0040955 A1 * | 2/2011 | Hooker | G06F 9/30043 |
| | | | 712/225 |
| 2013/0326198 A1 * | 12/2013 | Meier | G06F 9/3834 |
| | | | 712/216 |

(Continued)

OTHER PUBLICATIONS

Tingting Sha, M. M. K. Martin and A. Roth, "Scalable store-load forwarding via store queue index prediction," 38th Annual IEEE/ACM International Symposium on Microarchitecture (MICRO'05), Barcelona, Spain, 2005 (Year: 2005).*

(Continued)

*Primary Examiner* — Andrew Caldwell
*Assistant Examiner* — Kasim Alli
(74) *Attorney, Agent, or Firm* — NIXON & VANDERHYE P.C.

(57) ABSTRACT

A data processing apparatus is provided. Decode circuitry decodes a stream of instructions including a store instruction and a load instruction. Prediction circuitry predicts that the load instruction loads data from memory that is stored to the memory by the store instruction and the prediction is based on a hash of a program counter value of the store instruction.

12 Claims, 6 Drawing Sheets

(56) References Cited

U.S. PATENT DOCUMENTS

| | | | |
|---|---|---|---|
| 2013/0339671 A1* | 12/2013 | Williams, III | G06F 9/3838 |
| | | | 712/E9.023 |
| 2014/0095814 A1 | 4/2014 | Marden | |
| 2014/0108862 A1 | 4/2014 | Rafacz | |
| 2014/0143492 A1* | 5/2014 | Eckert | G06F 12/0802 |
| | | | 711/118 |
| 2014/0181482 A1* | 6/2014 | Smaus | G06F 9/3826 |
| | | | 712/225 |
| 2014/0325156 A1 | 10/2014 | Ardevol | |
| 2018/0052691 A1* | 2/2018 | Dunham | G06F 9/3004 |
| 2024/0126554 A1 | 4/2024 | Ishii | |
| 2024/0338321 A1* | 10/2024 | Ingalls | G06F 12/1009 |

OTHER PUBLICATIONS

U.S. Appl. No. 18/588,383, filed Feb. 27, 2024, Shulyak.
Notice of Allowance dated May 30, 2025 for U.S. Appl. No. 18/588,383, 24 pages.

\* cited by examiner

| Instruction | No renaming | With renaming | Comment |
|---|---|---|---|
| ADD x1, x0, #1 | ADD p1, p0, #1 | ADD p1, p0, #1 | Producer operation (p1 is destination register) |
| ... | ... | ... | |
| STR x1, [...] | STR p1, [ ] | STR p1, [ ] | Store operation providing data for future load |
| ... | ... | ... | |
| LDR x2, [...] | LDR p2, [ ] | LDR_check [ ] | Load operation consuming data from store |
| ... | ... | ... | |
| SUB x3, x2, #1 | SUB p3, p2, #1 | SUB p3, p1, #1 | Consumer operation |

The table is indexed by hashed load PC

| | Load instruction PC | Store instruction PC hash | Confidence |
|---|---|---|---|
| | ... | | |
| 0xB4 | 0x003214B4 | 0x42 | 8 |
| | ... | | |
| 0x88 | 0x84C92888 | 0x07 | -2 |
| | ... | | |
| 0x83 | 0xFA569283 | 0x04 | 0 |
| | ... | | |

Good_example: PC=X should forward data to LD

STR x1, [x0] // PC=X, PC_hash(X)=10

...

STR x3, [x2] // PC=Y, PC_hash(Y)=12

...

LDR x5, [x4] // depend on #HashedPC=10

FIG. 5A

Hash_Conflict:

STR x1, [x0] // PC=X, PC_hash(X)=10

...

STR x3, [x2] // PC=Y, PC_hash(Y)=10

...

LDR x5, [x4] // depend on #HashedPC=10

FIG. 5B

Same_Instruction:

STR x1, [x0] // PC=X, PC_hash(X)=10
... (loop) ...
STR x1, [x0] // PC=X, PC_hash(X)=10

...

LDR x5, [x4] // depend on #HashedPC=10

FIG. 5C

| UID | Store VA | Store PC | Hash(PC) |
|---|---|---|---|
| 20 | 0x1000 | 0xB000 | #32 |
| 22 | 0x1100 | 0xFFF0 | #21 |
| 28 | 0x1200 | 0xB000 | #32 |
| 31 | 0x2000 | 0xEEE0 | #21 |
| 33 | 0x1000 | 0xC000 | #10 |
| 40 | 0x1100 | 0xB000 | #32 |

700

STORE TO LOAD FORWARDING USING HASHES

TECHNICAL FIELD

The present disclosure relates to data processing.

DESCRIPTION

In a computer system, it can be wasteful of resources to store data to memory and then to load the data back from memory shortly afterwards.

SUMMARY

Viewed from a first example configuration, there is provided a data processing apparatus comprising: decode circuitry configured to decode a stream of instructions comprising a store instruction and a load instruction; and prediction circuitry configured to perform a prediction that the load instruction is configured to load data from memory that is stored to the memory by the store instruction, wherein the prediction is based on a hash of a program counter value of the store instruction.

Viewed from a second example configuration, there is provided method of data processing comprising: decoding a stream of instructions comprising a store instruction and a load instruction; and performing a prediction that the load instruction is configured to load data from memory that is stored to the memory by the store instruction, wherein the prediction is based on a hash of a program counter value of the store instruction.

Viewed from a third example configuration, there is provided a non-transitory computer-readable medium to store computer-readable code for fabrication of a data processing apparatus comprising: decode circuitry configured to decode a stream of instructions comprising a store instruction and a load instruction; and prediction circuitry configured to perform a prediction that the load instruction is configured to load data from memory that is stored to the memory by the store instruction, wherein the prediction is based on a hash of a program counter value of the store instruction.

BRIEF DESCRIPTION OF THE DRAWINGS

The present invention will be described further, by way of example only, with reference to embodiments thereof as illustrated in the accompanying drawings, in which:

FIG. 2 illustrates two examples of store/load forwarding;

FIG. 3 shows an example of a store/load Forwarding Correlation Table (FCT);

FIG. 5A illustrates an example in which store/load forwarding works correctly;

FIG. 5B shows an example where store/load forwarding breaks;

FIG. 5C shows another example where store/load forwarding breaks;

DESCRIPTION OF EXAMPLE EMBODIMENTS

Figure 1:
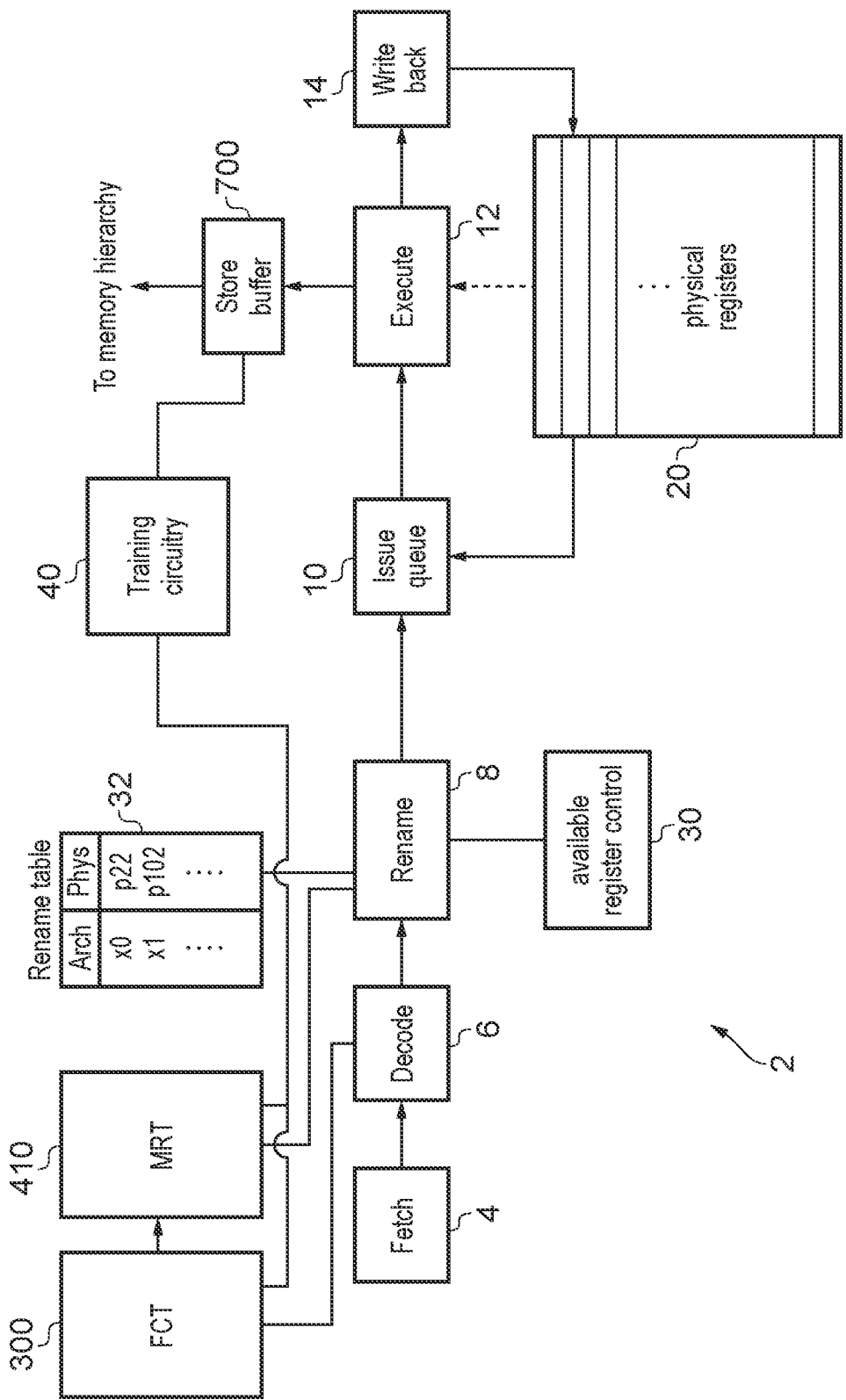
FIG. 1 schematically illustrates a portion of a processing pipeline in a data processing apparatus.

Before discussing the embodiments with reference to the accompanying figures, the following description of embodiments is provided.

In accordance with one example configuration there is provided there is provided a data processing apparatus comprising: decode circuitry configured to decode a stream of instructions comprising a store instruction and a load instruction; and prediction circuitry configured to perform a prediction that the load instruction is configured to load data from memory that is stored to the memory by the store instruction, wherein the prediction is based on a hash of a program counter value of the store instruction.

The prediction circuitry therefore uses a hash of a program counter value of the store instruction in its process of performing a prediction that the data saved to memory by the store instruction will be accessed by the load instruction. This makes it possible to make use of store/load forwarding techniques. By using a hash of a program counter value, as opposed to the program counter value itself, it is possible to make use of a smaller table. This is particularly important given that the speed at which the table can be accessed is likely to strongly affect the speed at which the pipeline can operate and that a smaller table can be accessed more quickly. Indeed, by using a hash of the program counter value, it is possible to index directly into one or more entries of the table that are relevant to the specific store instruction.

In some examples, the data processing apparatus comprises: storage circuitry configured to store a memory rename table indexed by the hash of the program counter value of the store instruction and containing data relating to a location in the memory that is the target of the store instruction. Store/load forwarding is typically only a prediction that data stored by the store instruction is then accessed by the load instruction. This may be because the actual address accessed by each of the store instruction and the load instruction may not be known until execution time. However, delaying execution to compare the two addresses may not be considered to be an acceptable delay. Instead, therefore, a prediction is made that the data will be the same and store/load forwarding techniques can be implemented on this basis. The memory rename table (MRT) can store a location in memory that is a target of the store and load instructions. Consequently, in parallel with performing the store/load forwarding techniques, the load instruction can execute and obtain the data from memory anyway. At execution of the load instruction, an address check is made by the CPU. That is, the CPU confirms that the predicted load should obtain the data from the specified store operation by comparing the address to be accessed with the address at which the store instruction took place. If the test passes (e.g. if they are the same) then the load instruction is allowed to complete. Once the load has completed and it reaches the head of the commit queue (or the reorder buffer) then the CPU commits the instruction execution.

If the test is failed, any instructions that rely on the store/load forwarding are flushed (if they have been executed speculatively) and those instructions and future instructions are instead made to rely on the data retrieved from the load instruction instead. The flush occurs for all instructions occurring after the load instruction. That is, a rewind occurs up the load instruction in program order and the first instruction following the flush is not permitted to perform the memory renaming prediction using the MRT (in some examples, the correspondence that was used is erased from the MRT).

In some examples, the data relating to the location in the memory that is the target of the store instruction is an index of a store buffer where the target of the store instruction is stored. A store buffer is typically used to track recent stores that occur to memory. In particular, store operations might be delayed in being sent to the memory hierarchy so that store operations can be amalgamated where appropriate. By providing an index of a particular entry in the store buffer, it is possible to know where the store instruction accessed, and this can be compared to where the load instruction accessed.

In some examples, the data processing apparatus comprises: renaming circuitry configured to rename at least one architectural register to which the load instruction loads the data from memory to a physical register from which the store instruction writes the data to the memory, based on the prediction. Register renaming is one technique by which store/load forwarding can occur. The process proceeds in a similar manner to move elimination—namely that two architectural registers (one used by the store instruction and one used by the load instruction) are made to point to the same physical register.

In some examples, the renaming circuitry is configured to additionally rename at least one architectural register to which a consumer instruction accesses the data to the physical register from which the store instruction writes the data to the memory. A consumer instruction is an instruction that occurs after the load instruction and makes use of the data that has been retrieved by the load instruction. In these examples, register renaming occurs so that a physical register specified by the store instruction to store data is used for the consumer instruction as well.

In some examples, the decode circuitry is configured to decode the load instruction as a move operation that copies the data from a register specified by the store instruction to a register specified by the load instruction. Another technique that can be used for store/load forwarding is to use a move instruction (or operation) to copy the data from the register specified by the load instruction to the register specified by the store instruction. In these situations, the load instruction again might still take place, but may be preempted by a move instruction. Again, when the load instruction is to be executed, it may determine whether the store/load forwarding process (implemented by the move operation) occurs correctly. If not, a rewind may occur and if so, the move operation is allowed to proceed.

In some examples, the data processing apparatus comprises: training circuitry configured to analyse an execution of the load instruction and to determine whether the data written by the store instruction is read by the load instruction. The training circuitry can establish whether the address that is accessed by the load instruction at execution matches the address to which the store was made by the store instruction. If there is no match, then a flush can be issued up to the load instruction itself.

In some examples, in response to determining that the data written by the store instruction is read by the load instruction, a confidence associated with the prediction is incremented; and in response to determining that the data written by the store instruction is not read by the load instruction, the confidence associated with the prediction is decremented. If the two match, then a confidence of the matching between the store instruction and load instruction is increased, otherwise it is decreased. The confidence could be represented by a counter, for instance, with high counter values corresponding with high confidence values. In that way, when the confidence is to increase, the counter also increases. In other embodiments, this could be reversed so that a high confidence is represented by a low counter value and a low confidence is represented by a high confidence value. Here, increasing the confidence equates to decreasing the confidence value expressed by the counter and decreasing the confidence equates to increasing the confidence value expressed by the counter.

In some examples, the prediction circuitry is configured to provide the prediction when the confidence is past a threshold. When the confidence reaches a certain level (i.e. when it is good enough), the prediction can result in a store/load forwarding process being performed. Below that level, the forwarding may not occur or may only occur with some probability (e.g. dependent on the level of confidence). As before, it will be appreciated that this does not necessitate some kind of minimum score, since a high confidence might be represented by a low confidence score on the counter for instance.

In some examples, the training circuitry is configured to determine whether the data written by the store instruction is read by the load instruction based on contents of a store buffer. A store buffer is a structure that is used to buffer outgoing store requests from the processor (or from the load/store unit) to the memory hierarchy. Typically such a structure is used to amalgamate multiple store requests so that one request can be sent rather than several. As a consequence of this, all store requests may be held in the buffer for a period of time before being sent out and this makes it possible to analyse whether there is a correlation between the load instruction and the suspected correlated store instruction when the load instruction is executed.

In some examples, the store buffer comprises one or more of: a store address of the store instruction, a program counter value of the store instruction, a hash of the program counter value of the store instruction and an operation number of the store instruction. Other fields may of course be present within the store buffer, but these fields make it possible to perform an analysis of whether the store instruction and a given load instruction are inter-related (e.g. they are accessing the same data).

In some examples, the stream of instructions comprises a loop that contains the store instruction. In a loop, a store instruction having a particular program counter value will be seen multiple times (e.g. there will be multiple instances of the same program counter value). This can be problematic because it may be difficult to determine which instance of the store instruction is connected to the load instruction. In some embodiments, such store instructions might be prohibited from engaging in store/load forwarding.

In some examples, the prediction is that an the load instruction that is configured to load data from memory is stored to the memory by a specific instance of the store instruction, and the specific instance of the store instruction is a youngest instance of the store instruction that is older than the load instruction. One way to deal with looped store instructions is to attempt to link the youngest instance of the store instruction that is older than the load instruction. Phrased differently, this would correspond with the instance of the store instruction that is closest (in program order) to the load instruction, yet still prior to the load instruction. Note that the other requirements also should match—for instance, both instructions are accessing the same (hashed) program counter value. One might assume that where several instances of a store instruction exist prior to a load instruction that is the most recent version of the store instruction that is most relevant—particularly since the two instructions are spatially closest to each other. Of course, the training and checking mechanism(s) will be able to determine whether this is the case or not. That is, if another instance of the store instruction is the one that is linked to the load instruction then the confidence value will not increment and so store/load forwarding will not occur for this store/load instruction pairing.

In some examples, the data processing apparatus comprises: storage circuitry configured to store the prediction. The storage circuitry could take the form of a memory rename table (MRT) for instance. Or the storage circuitry could take the form (depending on the nature of the prediction) of a Register Rename Table (RRT). The storage circuitry might also include both such tables or something else altogether. The prediction can be stored in a table so that the techniques associated with store/load forwarding can be implemented—such as register renaming for instance.

Particular embodiments will now be described with reference to the figures.

FIG. 1 schematically illustrates a portion of a processing pipeline in a data processing apparatus 2. The pipeline includes a number of stages including a fetch stage 4, a decode stage 6, a rename stage 8, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 12, 14 of the pipeline may be different from the instructions fetched from memory and the term "instruction" should be interpreted as encompassing a micro-operation. In these examples, the decode stage 6 is aided by a Forwarding Corresponding Table (FCT) 300 (which is an example of the claimed prediction circuitry), which is used to determine whether store/load forwarding should occur, which is a technique used for 'eliminating' the need to store data to memory and then to re-read it back from memory. The prediction in turn sets up a Memory Renaming Table (MRT) 300, which is used by the rename stage to implement the store/load forwarding.

The apparatus 2 has a number of physical registers 20 available for storing data values. A register renaming stage 8 performs register renaming for the decoded instructions (or micro operations) to map architectural register specifiers specified by the instructions to physical register specifiers identifying one of the physical registers 20. The instruction set architecture may support a certain number of architectural registers which are visible to the programmer. For example, a 4- or 5-bit register field in the instruction encoding may specify one of 16 or 32 different architectural register specifiers. However, to allow hazards between instructions specifying the same architectural register specifier to be resolved or to permit out of order or parallel processing of instructions, a greater number of physical registers may be provided, and the register rename stage 8 may map the architectural register specifiers in the decoded instructions to corresponding physical registers.

The renamed instructions now specifying physical register specifiers are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions. In these examples, a store buffer 700 is provided to buffer store operations on their way to the memory hierarchy.

When execution of the instruction is complete in the execute stage 12, the instruction is passed to the write back stage 14, which writes a result of the instruction to a physical register 20.

In the example shown in FIG. 1, for renamed instructions which specify one or more physical registers from which data values are to be read, the reading of the physical register takes place while the instruction is pending in the issue queue 10. However, other embodiments may read the physical registers 20 at the execute stage 12 instead, as shown by the dotted line in FIG. 1.

Available register control circuitry 30 is provided for controlling which of the physical registers can be selected by the rename stage 8 for mapping to an architectural register specifier. In general the available register control circuitry 30 may provide the rename stage 8 with an indication of which physical registers are available or unavailable for selection. When an instruction which writes to a register is received from the decode stage 6, the rename stage 8 generates a new register mapping for the architectural register specified as the destination register for the instruction. The rename stage 8 selects a physical register which is indicated as available by the available register control circuitry 30 and updates a rename table 32 to include a rename entry mapping the destination architectural specifier to the selected physical register.

The pipeline 2 supports speculative execution of instructions. Some instructions may be executed speculatively before it is known whether the instruction should be executed, or before it is certain that the result of the instruction will be valid. For example, following a branch instruction, some instructions may be executed speculatively based on a prediction of whether the branch is taken or not taken, before the actual branch outcome is known. When the speculation is correct, speculative execution can improve performance by eliminating a delay which would arise if the instruction was not executed until after it is known that the instruction should have executed or that its result will be valid. However, if the speculation turns out to be incorrect, then execution of the instruction may need to be cancelled and architectural state may need to be restored to the last valid state.

Finally, training circuitry 40 is provided to aid in generating entries for the FCT 300. Its behaviour will be discussed with respect to FIG. 7 below. The MRT 410 is used to track recently renamed stores.

It will be appreciated that FIG. 1 is merely an example illustration of one possible pipeline and that other pipelines may also be applicable to the present technique. In particular, the rename stage 8 may be optional and the use of the MRT 410 could take place at the decode stage instead.

FIG. 2 illustrates two examples of store/load forwarding. The stream of instructions 200 includes a producer instruction that produces some data. In this case, the producer instruction is an ADD instruction that takes a value stored in register x0, adds 1, and then stores the value in register x1. The data that is produced is therefore the value that is stored in register x1. Note that the registers being referred to here are architectural registers. That is, these are not the designations of physical registers but are instead symbolic names.

Later in the stream 200, a store instruction STR stores the value in register x1 to some memory address (the actual address is unimportant). Then, later in the stream 200, a load instruction LDR loads the value from the same memory address and stores the result in register x2.

Finally, in the stream 200 is a consumer instruction in the form of subtract instruction SUB. This takes the value stored in register x2, subtracts 1, and then stores the result in register x3.

Store/load forwarding takes advantage of the fact that in situations like this there is, technically, no need for the data to be stored to memory and then reloaded from memory. Memory operations are slow (even with the use of caches) and so avoiding memory accesses not only improves the instruction processing rate, but also reduces memory bandwidth and energy consumed in accessing the memory hierarchy.

One way of achieving store/load forwarding is with the use of a store buffer, which is a structure used to store data before it is sent out to the memory system. Regardless if the data is stored within the store buffer, then it may be accessed directly from that. The modified instructions for this technique are shown in the column "no renaming". The term here means that register renaming is not used to achieve store/load forwarding, not that no register renaming is performed at all. Indeed it can be seen that register renaming is performed as the architectural registers are renamed to physical registers (p1, p0, etc.) The store/load forwarding takes place entirely in the hardware in this example, and so the instructions need not be modified at all.

A second way of achieving store/load forwarding is by taking advantage of the observation that the data to be accessed by the load instruction LDR could be kept in a register used by the store instruction STR. In this situation, the ADD and STR instruction are unchanged except for the use of register renaming to apply physical registers. The consumer instruction SUB, however, now accesses the register p1 rather than the register p2 into which the LDR instruction would have loaded the data after reaccessing it from memory. The LDR instruction is still issued as usual. However, as part of this process, the load operation checks that the data that is to be loaded by the load instruction is the same as the data that is to be stored in the register p1. The reason for performing such a check is that it is not known for certain whether the same data is being used in each case without analysing the memory addresses being accessed. This in turn cannot be determined until execution time and performing this analysis would require multiple processor cycles to establish. Consequently, a prediction is made and the register renaming passes the data over via the registers in a 'speculative' manner. If the check reveals that the wrong data was provided, then a flush occurs in order to rewind the execution and the load instruction is performed normally. Details of this checking process are shown below.

Although not illustrated in the figure, another technique that can be used is to decode the load instruction LDR with a move operation that copies the data from the register specified by the store instruction to a register specified by the load instruction. So in this example, the store instruction STR x1, [ . . . ] followed by the load instruction LDR x2, [ . . . ] would result in the decoding of the load instruction to the operation equivalent to MOV x2 x1 (i.e. copy the data from x1 to x2).

Regardless of the technique used to perform the forwarding, it is necessary to both detect the relationship between the load/store address and to store it. Prediction can be achieved by simply recording, for each program counter value at which a store occurred, the address that was accessed. When load instructions are executed, they can consult this table and determine whether the same memory address is being accessed. This can be achieved at, for instance, the store buffer 700 as will be described with respect to FIG. 7.

Once an initial pairing has been established, then a confidence that the two program counter values are linked can be maintained. When the confidence is above some threshold, the link between the two instructions can be relied upon and one of the above two techniques for store/load forwarding can be applied. Similarly, if the confidence drops below another threshold then the entry might be deleted.

A problem arises in how to correlate the store and load values together. One possibility is to simply provide a fully associative table containing associations between load and store instructions. However, this would require the entire table to be searched each time a load instruction was encountered to see if a corresponding store instruction existed. Another possibility is to provide a direct mapped table. However, this would require having one entry for each possible program counter value since a load instruction could appear at any program counter value. This would result in a very large data structure. The present technique therefore uses a hash of the program counter value in order to index into the table. The table could be directly mapped or could be set associative as desired.

FIG. 3 shows an example of a store/load Forwarding Correlation Table (FCT) 300 that is used to track the confidence of relationships between the store and load instructions. When a load instruction is encountered, its program counter value is hashed to provide an index into the table 300 so that the table need not be searched. Each entry of the table includes the full program counter of the load instruction to check that the entry is correct and/or to locate the entry (e.g. when the table is set associative). Each entry also contains a hash of the corresponding store instruction, and the confidence value. In this example, the second entry with a confidence of −2 might be on the verge of being deleted from the table 300. Meanwhile, the first entry with a confidence of 8 might be the subject of store/load forwarding. This can be achieved by setting appropriate entries in the MRT table 410, which is then used to perform the store/load forwarding.

Figure 4:
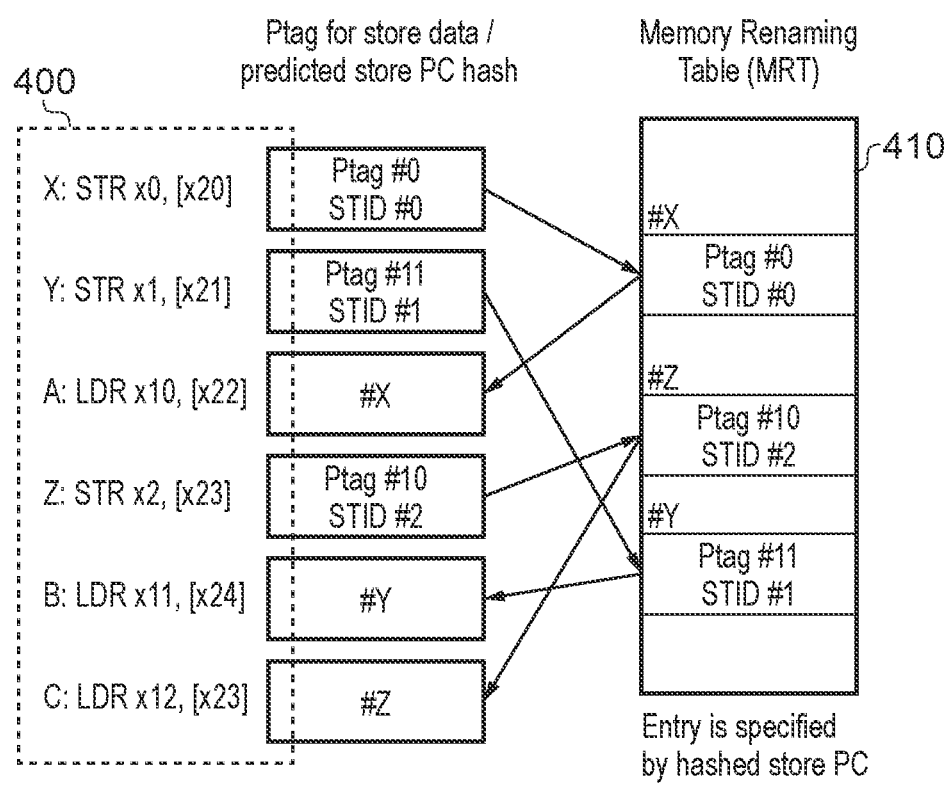
FIG. 4 illustrates further data structures that are used to perform the register renaming and checking/training process.

FIG. 4 illustrates further data structures that are used to perform the store/load forwarding. In this example, register renaming is being used to implement the store/load forwarding. In particular, FIG. 4 shows the use of a Memory Renaming Table (MRT) 410, which is analogous to a Register Rename Table used in register renaming. FIG. 4 illustrates a stream of instructions 400 comprising a number of store and load instructions at program counter values X, Y, A, Z, B. and C respectively. In this example, as each store instruction is encountered, register renaming will rename the architectural registers to physical registers using typical register renaming techniques. Where a store instruction is encountered that corresponds to an entry in the store/load forwarding correlation table 300, an entry is stored in the MRT 410. The entry is stored at an index corresponding to a hash of the program counter value for the store instruction. For instance, for the store instruction at a program counter value of X, an entry is stored in the MRT 410 at an index hash(X) (also illustrated as #X). The entry contains the Ptag—that is, an indication of the identity of the physical register that was assigned to the store instruction during register renaming. Or phrased differently, the allocated physical register where the data is being written from (to memory). In addition, the entry stored an STID (store buffer identifier), which is used for checking that the forwarding occurred correctly (discussed in more detail with respect to FIG. 7).

When the corresponding load instruction is encountered (the correspondence being the one stored in the store/load forwarding correlation table 300, the hash value of the store instruction that provide the data is known (e.g. from the store/load forwarding correlation table 300). This can be used to index into the MRT 410 in order to retrieve the Ptag/physical register corresponding to the location of the data in the register file and the STID. The Ptag can then be written to the register renaming table in correspondence with the architectural register specified by the load instruction (in a manner that is synonymous with move elimination). Thereafter, any consumer instruction that refers to the architectural register specified by the load instruction will be rewritten to use the Ptag now specified in the MRT 410.

For example, when the instruction at program counter A is encountered, it is noted that this has a correspondence with the store instruction at program counter X. X is hashed and used to index into the MRT 410. This reveals that the Ptag is 0 and the STID is 0. Consequently the Ptag value 0 is stored in the register rename table in correspondence with architectural register x10, which is where the load instruction at program counter value A would have stored the data. Thereafter, any consumer instruction that refers to register x10 will be rewritten to use register p0.

The load instruction still performs the load operation. However, after having performed the load operation, a check is made to ensure that it corresponds with the data stored in register x10. If not, then a pipeline flush is performed up to the load instruction. The correspondence between x10 and p0 is erased. This time, the data that has been fetched by the load instruction is used by following instructions rather than the data that was stored in register x10 (the correspondence having been erased from the register rename table).

Note that this technique is not specific to situations where register renaming occurs. When store/load forwarding occurs without register renaming, the table does not contain the Ptag, but does include the relevant STID.

However, hashing the strong instruction program counter value to index into the MRT 410 can cause some problems.

Firstly, FIG. 5A illustrates an example in which store/load forwarding works correctly where program counter hash values are used. A first store instruction at a program counter value X takes the data stored in register x1 and stores it at the memory address stored in register x0. The hash of program counter value X is 10 in this example. A second store instruction at program counter value Y stores the data in register x3 at the address stored in register x2. The hash of program counter value Y is 12. Finally, a load instruction loads the data at the address stored in register x4 and stores that data to register x5. In this example, the address stored in register x4 and the address stored in register x0 are determined (at runtime) to be the same. The correlation is stored that the load instruction is dependent on a hashed program counter value of 10 and once sufficient confidence is established, one of the aforementioned store/load forwarding techniques can be used.

Next, FIG. 5B shows an example where this breaks. The instructions themselves are the same as illustrated in FIG. 5A. However, this time, the hash value of program counter Y also equates to the value 10. Now, it is not clear which of the two store instructions is connected to the load instruction.

Finally, FIG. 5C shows another example where this breaks. In this example, the store instruction to which the load instruction is linked is within a loop that is executed multiple times. Consequently the program counter value of each instance of the store instruction will be the same (and therefore the hash will also be the same). It is therefore not known which instance of the store instruction is associated with the load instruction. This is true even if hashed program counter values are not used to identify the linkage and instead only full program counter values are used.

The present technique overcomes these limitations. In particular, having identified that a correspondence exists between a load instruction and a plurality of store instructions having the same program counter hash value, the present technique assumes that the load instruction corresponds with the youngest store instruction (having the specified program counter hash value) that is older than the load instruction in program order. This corresponds with the store instruction that is prior to and nearest the load instruction in program order.

Figures 6, 7:
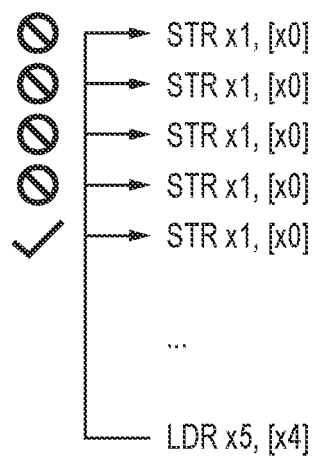
FIG. 6 illustrates the code of example FIG. 5C with the loop unwrapped.
FIG. 7 shows an operation of the training circuitry.

For instance, FIG. 6 illustrates the code of example FIG. 5C with the loop unwrapped. Here, each of the load instructions LDR will have the same hash value because they have the same program counter value. In this case, the predictor will assume that the relationship is between the last LDR instruction and the STR instruction. Furthermore, any confidence checking process will require that the data loaded by the load instruction originates from the correct instance of the STR instruction (in this case, the final instance). If this requirement is not met then the confidence value is decremented.

FIG. 7 shows an operation of the training circuitry 40 with respect to a store buffer 700 that is used in checking/training. In particular, the training circuitry 40 can be used to set up and maintain entries in the MRT 410 and FCT 300 by using the store buffer 700. The store buffer 700 is a buffer of store operations, which is kept prior to the store operations being sent out to the memory hierarchy.

As previously described, the load instruction LDR is still performed, even though the store/load forwarding process means that the data retrieved by the load instruction LDR is not strictly needed. Instead, the load instruction LDR is performed and is then followed by the following check to ensure that the data passed as part of the store/load forwarding matches what was actually fetched by the load instruction LDR.

Consequently, once the load has been executed, this process searches the store buffer 700 to search recently performed stores belonging to the hashed store program counter value. Each entry of the store buffer contains a UID, which is a (micro-)operation identifier. The UIDs are allocated to (micro-)operations, which are generated by the decode circuitry. They therefore represent the age of a (micro-)operation (or instruction) in program order with smaller values representing older (micro-)operations. Each entry also contains a virtual address at which the store is to take place, a program counter value of the instruction corresponding with the (micro-)operation, and a hash of the program counter value so that this need not be repeatedly recalculated.

When store/load forwarding occurs, the hashed store PC value corresponding to the load is obtained (e.g. from the MRT 410) together with the STID, which is also a (micro-)operation identifier for that store instruction.

The store buffer is then searched. If there is an entry having the same hashed store PC value with a UID that is younger that the STID and older than the load's UID then the requirements fail and the confidence for this store/load combination is decremented. Otherwise it is incremented.

For example, a load operation with a UID of 32 is assessed. It accesses a virtual address 0x1100. The STID mentioned in the MRT 410 for this load is 22 and forwarding has/will therefore occurred from an instruction having a (micro-)operation with this UID. Looking at the entry in the store buffer 700, we can see that the hash(PC) associated with UID=22 is 21 (this can also be deduced from the index of the MRT 410). Looking again at the store buffer, we can see that the requirements are not met. In particular, there is a newer entry in the store buffer (greater than UID=22) that is older than the load (UID=32)—namely a store with a UID of 31. This store's program counter value also has a hash of 21. The store/load forwarding has therefore occurred incorrectly due to a hash conflict and so a flush must occur for instructions following the load instruction. Furthermore, a confidence value for this store/load pairing is decremented.

As another example, a load operation with a UID of 35 is assessed. It accesses a virtual address 0x1200. The STID mentioned in the MRT 410 for this load is 28 and forwarding has/will therefore occurred from an instruction having a (micro-)operation with this UID. Looking at the entry in the store buffer 700, we can see that the hash(PC) associated with UID=28 is 32 (again, this could be deduced from the MRT 410). Looking at the store buffer, we see that the requirements are met. In particular, each entry in the store buffer that is greater than 32 and less than 35 has a different hash(PC). Indeed, there is only one such entry having a UID of 33. The hash(PC) value is 10, which clearly differs from 32. Confidence for this store/load pairing is therefore incremented.

Note that the store buffer 700 can also be used to determine an initial pairing, as well. In particular, if the UID and the VA accessed by a load operation are known, then the store buffer can be searched for an entry younger than the UID that access the same VA.

Figure 8:
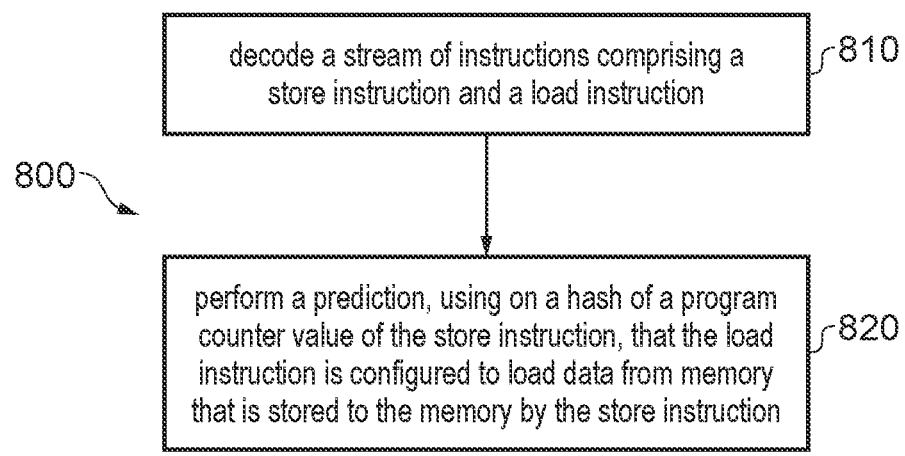
FIG. 8 illustrates a flow chart that shows a method of data processing in accordance with some examples.

FIG. 8 illustrates a flow chart 800 that shows a method of data processing in accordance with some examples. At a step 810, a stream of instructions comprising a store instruction and a load instruction are decoded. Then at step 820, a prediction is performed. The prediction is that the load instruction is configured to load data from memory that is stored to the memory by the store instruction and this prediction is carried out using a hash of a program counter value of the store instruction.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
    decode circuitry configured to decode a stream of instructions comprising a store instruction and a load instruction; and
    prediction circuitry configured to perform a prediction that the load instruction is configured to load data from memory that is stored to the memory by the store instruction, wherein
    the prediction is based on a hash of a program counter value of the store instruction.
2. The data processing apparatus according to clause 1, comprising:
    storage circuitry configured to store a memory rename table indexed by the hash of the program counter value of the store instruction and containing data relating to a location in the memory that is the target of the store instruction.
3. The data processing apparatus according to clause 2, wherein
    the data relating to the location in the memory that is the target of the store instruction is an index of a store buffer where the target of the store instruction is stored.
4. The data processing apparatus according to any preceding clause, comprising:
    renaming circuitry configured to rename at least one architectural register to which the load instruction loads the data from memory to a physical register from which the store instruction writes the data to the memory, based on the prediction.
5. The data processing apparatus according to clause 4, wherein
    the renaming circuitry is configured to additionally rename at least one architectural register to which a consumer instruction accesses the data to the physical register from which the store instruction writes the data to the memory.
6. The data processing apparatus according to any one of clauses 1-3, wherein
    the decode circuitry is configured to decode the load instruction as a move operation that copies the data from a register specified by the store instruction to a register specified by the load instruction.
7. The data processing apparatus according to any preceding clause, comprising:
    training circuitry configured to analyse an execution of the load instruction and to determine whether the data written by the store instruction is read by the load instruction.
8. The data processing apparatus according to any preceding clause, wherein
    in response to determining that the data written by the store instruction is read by the load instruction, a confidence associated with the prediction is incremented; and
    in response to determining that the data written by the store instruction is not read by the load instruction, the confidence associated with the prediction is decremented.
9. The data processing apparatus according to clause 8, wherein
    the prediction circuitry is configured to provide the prediction when the confidence is past a threshold.
10. The data processing apparatus according to any one of clauses 7-9, wherein
    the training circuitry is configured to determine whether the data written by the store instruction is read by the load instruction based on contents of a store buffer.
11. The data processing apparatus according to clause 10, wherein
    the store buffer comprises one or more of: a store address of the store instruction, a program counter value of the store instruction, a hash of the program counter value of the store instruction and an operation number of the store instruction.
12. The data processing apparatus according to any preceding clause, wherein
    the stream of instructions comprises a loop that contains the store instruction.
13. The data processing apparatus according to clause 13, wherein
    the prediction is that an the load instruction that is configured to load data from memory is stored to the memory by a specific instance of the store instruction; and
    the specific instance of the store instruction is a youngest instance of the store instruction that is older than the load instruction.
14. The data processing apparatus according to any preceding clause, comprising:
    storage circuitry configured to store the prediction.
15. A method of data processing comprising.
    decoding a stream of instructions comprising a store instruction and a load instruction; and
    performing a prediction that the load instruction is configured to load data from memory that is stored to the memory by the store instruction, wherein
    the prediction is based on a hash of a program counter value of the store instruction.
16. A non-transitory computer-readable medium to store computer-readable code for fabrication of a data processing apparatus comprising:

decode circuitry configured to decode a stream of instructions comprising a store instruction and a load instruction; and prediction circuitry configured to perform a prediction that the load instruction is configured to load data from memory that is stored to the memory by the store instruction, wherein the prediction is based on a hash of a program counter value of the store instruction.

We claim:

1. A data processing apparatus comprising:

decode circuitry configured to decode a stream of instructions comprising a store instruction and a load instruction;

prediction circuitry configured to perform a prediction that the load instruction is configured to load data from memory that is stored to the memory by the store instruction;

renaming circuitry configured to rename at least one architectural register to which the load instruction loads the data from the memory to a register identifier identifying a register from which the store instruction writes the data to the memory, based on the prediction; and storage circuitry configured to store:

a memory rename table indexed by a hash of a program counter value of the store instruction and specifying the register identifier identifying the register from which the store instruction writes the data to the memory and a store buffer identifier; and a forwarding correlation table configured to track a relationship between the store instruction and the load instruction, and specifying the hash of the program counter value of the store instruction;

wherein the prediction circuitry is configured to perform the prediction that the load instruction is configured to load the data from the memory that is stored to the memory by the store instruction by:

identifying the hash of the program counter value of the store instruction from the forwarding correlation table based on a hash of a program counter value of the load instruction;

using the hash of the program counter value of the store instruction as an index to access the memory rename table to identify the register identifier identifying the register from which the store instruction writes the data to the memory.

2. The data processing apparatus according to claim 1, wherein the renaming circuitry is configured to additionally rename at least one architectural register to which a consumer instruction accesses the data to the register identifier identifying the register from which the store instruction writes the data to the memory.

3. The data processing apparatus according to claim 1, wherein the decode circuitry is configured to decode the load instruction as a move operation that copies the data from a register specified by the store instruction to a register specified by the load instruction.

4. The data processing apparatus according to claim 1, comprising:

training circuitry configured to analyze an execution of the load instruction and to determine whether the data stored to the memory by the store instruction is read by the load instruction.

5. The data processing apparatus according to claim 4, wherein the training circuitry is configured to determine whether the data stored to the memory by the store instruction is read by the load instruction based on contents of a store buffer.

6. The data processing apparatus according to claim 5, wherein the store buffer comprises one or more of: a store address of the store instruction, the program counter value of the store instruction, the hash of the program counter value of the store instruction and an operation number of the store instruction.

7. The data processing apparatus according to claim 1, wherein in response to determining that the data written by the store instruction is read by the load instruction, a confidence associated with the prediction is incremented; and in response to determining that the data stored to the memory by the store instruction is not read by the load instruction, the confidence associated with the prediction is decremented.

8. The data processing apparatus according to claim 7, wherein the prediction circuitry is configured to provide the prediction when the confidence is past a threshold.

9. The data processing apparatus according to claim 1, wherein the stream of instructions comprises a loop that contains the store instruction.

10. The data processing apparatus according to claim 1, wherein the:

storage circuitry is further configured to store the prediction.

11. A method of data processing on a data processing apparatus, the method comprising:

decoding, by decode circuitry, a stream of instructions comprising a store instruction and a load instruction; and performing, by prediction circuitry, a prediction that the load instruction is configured to load data from memory that is stored to the memory by the store instruction;

renaming, by renaming circuitry at least one architectural register to which the load instruction loads the data from the memory to a register identifier identifying a register from which the store instruction writes the data to the memory, based on the prediction; and storing, by storage circuitry:

a memory rename table indexed by a hash of a program counter value of the store instruction and specifying the register identifier identifying the register from which the store instruction writes the data to the memory and a store buffer identifier; and a forwarding correlation table configured to track a relationship between the store instruction and the load instruction, and specifying the hash of the program counter value of the store instruction;

performing, by prediction circuitry, the prediction that the load instruction is configured to load the data from the memory that is stored to the memory by the store instruction by:

identifying the hash of the program counter value of the store instruction from the forwarding correlation table based on a hash of a program counter value of the load instruction;

using the hash of the program counter value of the store instruction as an index to access the memory rename table to identify the register identifier identifying the register from which the store instruction writes the data to the memory.

12. A non-transitory computer-readable medium to store computer-readable code for fabrication of a data processing apparatus comprising:

decode circuitry configured to decode a stream of instructions comprising a store instruction and a load instruction; and prediction circuitry configured to perform a prediction that the load instruction is configured to load data from memory that is stored to the memory by the store instruction;

renaming circuitry configured to rename at least one architectural register to which the load instruction loads the data from the memory to a register identifier identifying the register from which the store instruction writes the data to the memory, based on the prediction; and storage circuitry configured to store:
- a memory rename table indexed by a hash of a program counter value of the store instruction and specifying the register identifier identifying the register from which the store instruction writes the data to the memory and a store buffer identifier; and
- a forwarding correlation table configured to track a relationship between the store instruction and the load instruction, and specifying the hash of the program counter value of the store instruction;

wherein the prediction circuitry is configured to perform the prediction that the load instruction is configured to load the data from the memory that is stored to the memory by the store instruction by:

identifying the hash of the program counter value of the store instruction from the forwarding correlation table based on a hash of a program counter value of the load instruction;

using the hash of the program counter value of the store instruction as an index to access the memory rename table to identify the register identifier identifying the register from which the store instruction writes the data to the memory.

\* \* \* \* \*